Aug. 26, 1952 F. H. FAILOR 2,608,646

AUTOMATIC APPROACH CLEARING APPARATUS FOR CENTRALIZED TRAFFIC CONTROL SYSTEMS

Filed July 31, 1948 2 SHEETS—SHEET 1

INVENTOR.
Franklin H. Failor.
BY [signature]
HIS ATTORNEY

Aug. 26, 1952 F. H. FAILOR 2,608,646

AUTOMATIC APPROACH CLEARING APPARATUS FOR CENTRALIZED TRAFFIC CONTROL SYSTEMS

Filed July 31, 1948 2 SHEETS--SHEET 2

INVENTOR.

Franklin H. Failor

BY

HIS ATTORNEY

Patented Aug. 26, 1952 2,608,646

UNITED STATES PATENT OFFICE 2,608,646

AUTOMATIC APPROACH CLEARING APPARATUS FOR CENTRALIZED TRAFFIC CONTROL SYSTEMS

Franklin H. Failor, Pittsburgh, Pa., assignor to Westinghouse Air Brake Company, a corporation of Pennsylvania Application July 31, 1948, Serial No. 41,863

4 Claims. (Cl. 246—3)

Figure 1A:
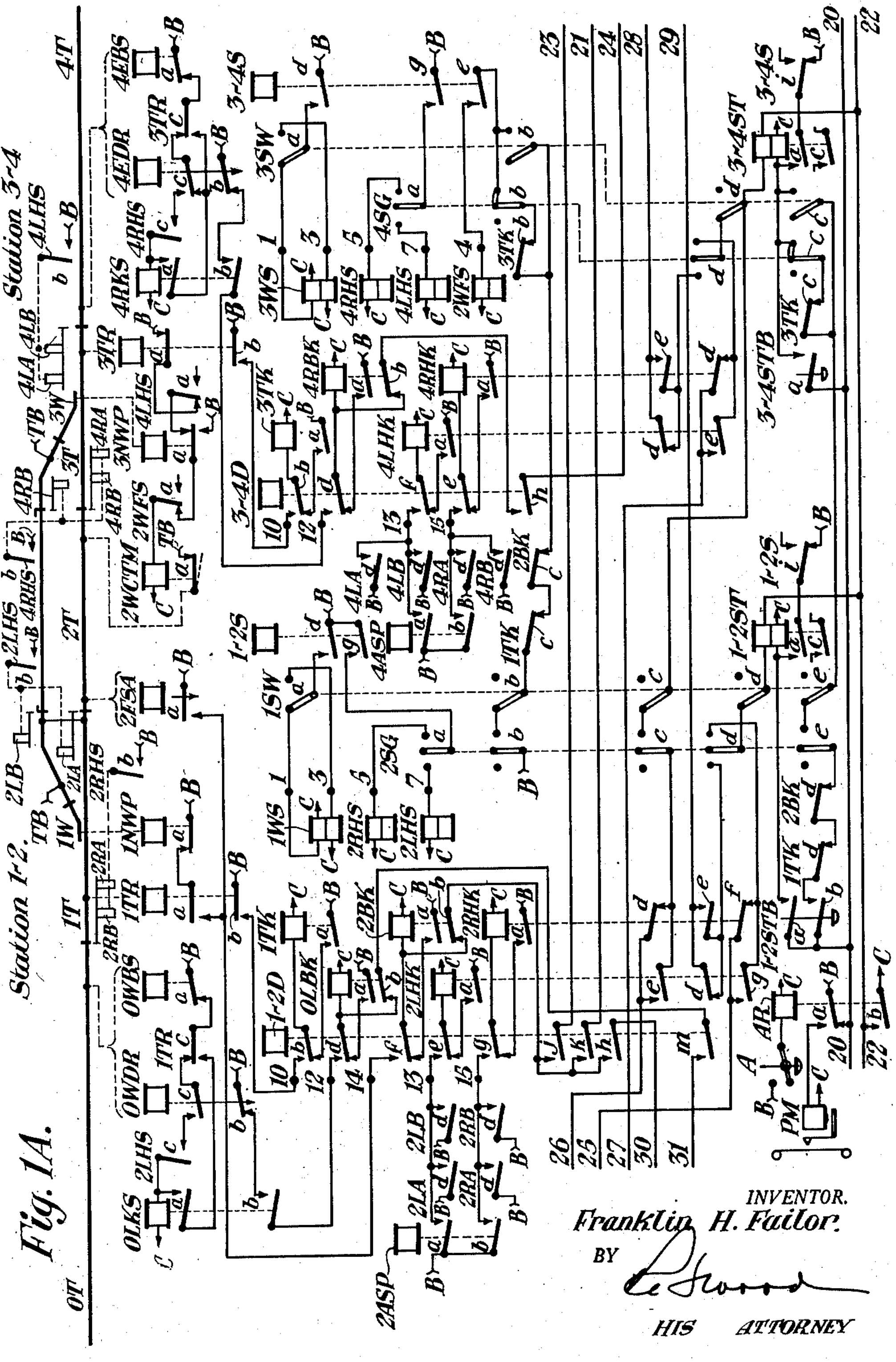

My invention relates to centralized traffic control systems for railroads, and more particularly to the provision of means in such systems for effecting the automatic approach clearing of signals by central office control.

My invention is particularly advantageous for use in connection with the control, by a centralized traffic control system, of automatic block signaling systems of the normally inactive or normally deenergized coded track circuit types.

In such systems the usual practice is to activate the wayside signaling equipment for a block and to set the coded track circuits into operation by manual control from the central office by means of a code type communication system whenever the entering signal for the block is to be cleared, the signal control relay for the signal being operated at the same time. Generally, the signal control relay is restored automatically to normal when the block is entered by a train and the signal is thereby put to stop, the wayside apparatus returning automatically to its inactive or deenergized condition when the block is vacated, provided the signal control relay has not been reoperated by central office control in order to clear the signal for a following train.

One advantage of signaling systems of the types referred to is that it is practicable to discontinue the operation of the coded track circuit equipment for long periods in the event train movements are infrequent, thereby eliminating unnecessary wear of moving parts and reducing the energy consumption, to an extent which makes it economically practicable for primary battery sources of energy to be used, particularly at intermediate signal locations where other power sources are not readily available.

This advantage is of course lost to a large extent if the operator activates the apparatus for blocks which are not to be occupied by a train within a reasonable time, as he may do, for example, merely to satisfy himself that the signaling system is in working order. A further objection to the practice of clearing the signals too far ahead of a train, is that the operation of the conventional time locking apparatus which occurs when the signals are cleared and are then returned manually to stop in order to make changes in routes which may become necessary or desirable, delays the clearing of the signals for the new routes and thereby interferes with traffic movements.

The principal object of my invention is to provide automatic approach clearing apparatus at the control office by which the operator, by the manipulation of a suitable master lever, is enabled to inactivate the means by which switch and signal controls are manually initiated in the normal operation of the communication system, and to render active a novel arrangement by which controls for clearing the signals at each of the stations in an extended territory are initiated automatically in response to indications received from other stations in the rear, indicating the arrival of approaching trains at such stations. When the automatic control which characterizes my invention is in effect, the operator is enabled to designate a route which includes any desired number of blocks in advance of a train by the operation of the appropriate switch and signal levers, but he is not able to activate the apparatus for clearing the entering signals for such blocks, and the controls for activating the apparatus for each block in the designated route and for clearing the entering signal therefor are each issued automatically upon the reception at the office of an indication of the arrival of the train at a station which is an appropriate distance in the rear of such signal.

In this manner the clearing of the signals is effected at the proper times without further attention by the operator, and the clearing of each signal is delayed until its clearing is necessary to expedite the progress of the train.

Furthermore, the control for clearing a signal automatically is not issued unless its signal lever has been reversed to indicate that the operator intends the signal to be cleared, nor is it issued unnecessarily, in the event an indication has been received that the signal has already been cleared.

In certain forms of single track signaling systems employing reversible track or line circuits for the control of the signals, the transmission of a control to the station at the exit end of the block for the desired traffic direction is required in order to activate the system.

In such systems the second control is generally issued without any action on the part of the operator over that required for the issue of a control for clearing a signal.

The automatic approach clearing apparatus of my invention is so arranged that when necessary, two controls are issued automatically, one to the station at the entrance end of the block for the operation of the signal control relay, and the other to the station at the exit end for operating the corresponding traffic relay.

In centralized traffic control systems the usual practice is to provide a train graph for automatically recording train movements through the various stations of the system. For use in connection with my invention, it is the practice to provide train graph pens which additionally record the condition of the block signals, as shown, for example, in Figs. 6 and 8 of Letters Patent of the United States No. 2,425,843, issued August 19, 1948, to C. S. Snavely, for a three-position electromagnet. A feature of my invention is the provision of an additional pen on the train graph for indicating when the automatic approach clearing apparatus of my invention is active.

To summarize the foregoing, my invention is embodied in a system of circuits at the control office of a centralized traffic control system for interconnecting the control means for apparatus at wayside stations with indication means controlled from other wayside stations, in such manner as to enforce a prescribed mode of operation of the system. When this apparatus is in use, the operator is unable to issue any controls for operating the wayside apparatus, but is able to select the signals that he wishes to have cleared, by the reversal of their respective levers, and in that manner, to designate a traffic route comprising an extended series of blocks without energizing any of the wayside apparatus. The apparatus of my invention then issues the signal controls automatically in such manner that the apparatus for each block is energized only from the time a train enters an extended approach zone, until it vacates the block.

Although this apparatus may be cut in or out of service at the will of the operator, the continuous record made by the additional pen referred to, in conjunction with the records made by the other train graph pens provides adequate means for detecting whether or not the apparatus of my invention is employed in the prescribed manner so as to obtain the desired economy in the use of wayside battery energy.

Other objects and features of my invention will be apparent from the following description taken in connection with the accompanying drawings.

I shall describe one form of centralized traffic control system embodying my invention and shall then point out the novel features thereof in claims.

Figure 1B:
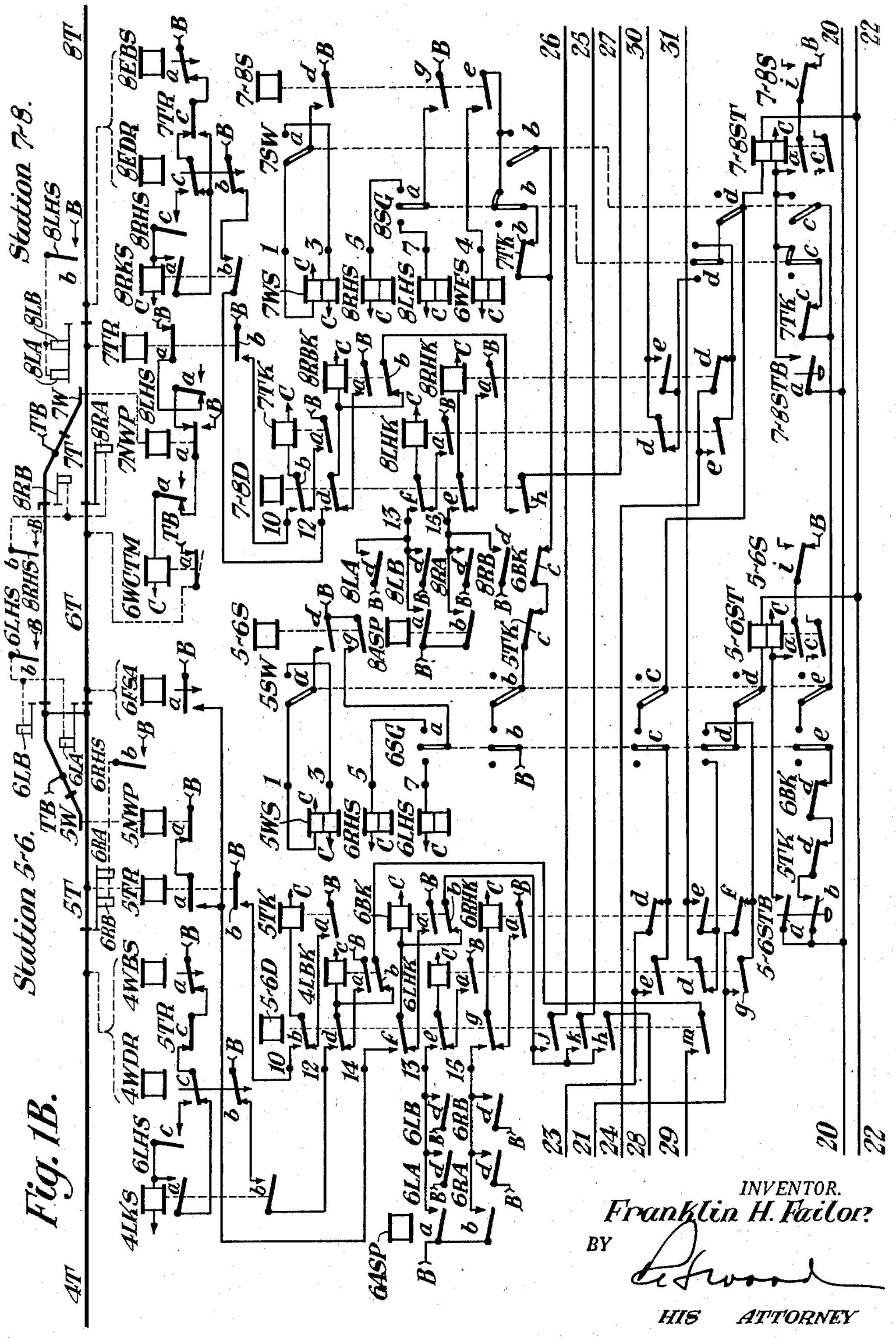

In the accompanying drawings, Figs. 1A and 1B, taken together with Fig. 1A at the left, illustrate the circuits for the automatic approach clearing apparatus of my invention as applied to the control of the signals at four successive block stations on a single track railroad arranged in accordance with the track plan which extends across the top of the drawings.

It will be readily understood that my invention may be applied to various types of communication systems and that it is adapted to control various forms of block signal systems. A typical and widely used communication system and the one chosen to illustrate my invention and shown, in part, in the drawings, is the "Time Code System," of the form shown and described in Letters Patent of the United States No. 2,411,375, issued November 19, 1946, to Arthur P. Jackel, for Remote Control Systems. The portions of this system shown herein comprise the four panels of the control machine at the office for governing the transmission of selective controls to, and the reception of indications from, the four stations shown in the track plan, together with the apparatus directly related thereto at the stations. The circuits and apparatus for each of these panels is similar to that for the typical panel shown in Fig. 1C of the Jackel patent except for minor modifications hereinafter described, the corresponding wayside connections being shown in Fig. 2C of this patent.

Consideration of the detailed mode of operation of the code communication system is not needed for an understanding of my invention, and it is deemed sufficient to point out that the office and stations are provided with coding units controlled over a pair of line wires extending from the office through each station in turn over which control codes are transmitted at times to a selected station, and indication codes are transmitted at other times over the same line wires to the office from the different stations, one at a time, without interference.

Each coding unit is adapted to control a track switch and related group of signals for governing traffic movements in both directions over a track switch at one end of a passing siding, such as the switch 1W and the signals 2RA, 2RB, 2LA and 2LB at station 1—2 in Fig. 1A. Corresponding apparatus units at the different stations are identified by similar letter designations having different numerical prefixes according to the location.

The transmission of each control code is initiated or stored for transmission if the line circuit is not immediately available for its transmission, by the operation of a starting relay such as the relay 234ST of Fig. 1C of the Jackel patent, or the relays 1-2ST, 3-4ST, etc. shown herein, which relay is actuated by a manually operable starting button 1-2STB, 3-4STB, etc., in the normal operation of the system. Each indication code is energized by a station starting relay, such as the relay ST of Fig. 2C of the Jackel patent, not shown herein, in response to a change in condition of any of the indicated devices at the station.

Each control code includes a distinctive code call by which a particular station is selected, and at the office, a selector relay such as the relay 1-2S is operated to momentarily establish a series of seven control channels over which polar stick control relays at the station selected by the code call are operated in accordance with the positions of their respective control levers in the corresponding office panel. These control channels are for simplicity illustrated herein as direct wire connections between the local circuits at the office and those at the selected station, and include channels 1 and 3 for operating a switch control relay such as relay 1WS to a position of agreement with its switch lever 1SW, and channels 5 and 7 for operating two signal control relays such as 2RHS and 2LHS, according to the position of a signal lever such as 2SG. In addition, at the station at the right-hand end of each siding, a traffic relay such as relay 2WFS is controlled over channel 4 by that signal lever, such as lever 2SG, which controls the entering signal at the opposite end of the siding, as hereinafter described.

Each indication code initiated at a station also includes the station code call, which in this case results in the operation of a delivery relay, such as the relay 1-2D, for the corresponding office panel, to establish a series of seven indication channels over which indication stick relays at the office are positioned in accordance with the condition of energization of the channels at the station of origin of the code. Those shown herein include channel 10 for the control of a track indication relay, such as relay 1TK, for indicating occupancy of the detector track section 1T for the track switch at the station, when terminal B at back contact b of the track relay 1TR is connected to the station terminal 10, channels 13 and 15 for controlling signal indication relays such as the relays 2RHK and 2LHK, one or the other of which is energized over a contact d controlled by the signal when one of the corresponding signals is cleared. These signal indication relays are also controlled by contacts a and b of a repeating relay 2ASP, which is governed by approach locking stick relays, not shown, so that both signal indication relays are energized to distinctively indicate when the approach or time locking is effective.

In addition, channels 12 and 14 are used to control various block indication relays BK to indicate occupancy of the blocks which include the track stretches 2T, 4T, 6T, etc., extending from station to station, in a manner hereinafter to be pointed out.

It is assumed that two different types of coded reversible track circuit signaling systems are provided for the main tracks in the passing track area and in the single track stretch, respectively, and since the operation of the apparatus of my invention involves through train movements over the lower main track, when all switches are normal as shown, the control of train movements over the upper passing tracks will not be considered.

The signaling apparatus for the main track blocks in the passing track area, including the sections 2T and 6T, is to be understood to be of the type disclosed in Letters Patent of the United States No. 2,390,010, issued November 27, 1945, to Henry A. Talbert and Crawford E. Staples, for Railway Signaling Apparatus, or a modification thereof shown and described in an application for Letters Patent of the United States, Serial No. 761,667, filed July 17, 1947, by Frank T. Pascoe, for a Centralized Traffic Control System, now Patent No. 2,526,404, issued October 17, 1950. By reference to the Talbert et al. patent, it will be seen that this system is of the reversible coded track circuit type in which the entering signals are arranged to be controlled by coded current transmitted over the track rails from the opposite end, in one direction or the other, and that the system is normally in an inactive condition in which a code transmitter relay 2WCTM (shown at the left-hand end of the block section 2T in Fig. 1A of the Talbert et al. patent, but shown herein in Fig. 1A at the right-hand end) is normally energized. As shown herein, the circuit for relay 2WCTM may be traced from terminal C through its winding over the normal contact a of the traffic relay 2WFS to terminal B either at the back contact a of relay 3NWP, or over this front contact, the normal contact a of the signal control relay 4LHS to terminal B at the front contact a of the track relay 3TR. When energized, relay 2WCTM supplies steady current to the rails of section 2T to effect the energization of a repeating relay FSA controlled by the track relay at the opposite end, the release of which connects terminal B of the local source of energy over its back contact a to the station terminal 14 and thereby energizes the block indication relay 2BK at the office to indicate block occupancy. It will be seen that the stretch of track indicated by relay 2BK includes not only section 2T, but also sections 1T and 3T when the respective track switches 1W and 3W are normal, as indicated by the energization of the switch repeating relays 1NWP and 3NWP. That is to say, when section 1T is occupied, channel 14 at station 1—2 is connected to terminal B over contacts a of relays 1TR and 1NWP, and when section 3T is occupied, over contact a of relay 2FSA, which relay releases as the result of the opening of contact a of relay 3TR.

Referring to Fig. 1A of the present application, it is to be understood that to set the system into operation for a traffic movement from right to left to clear signal 4LA, relay 2WCTM is released by reversing the signal control relay 4LHS, and the opening of contact a of relay 2WCTM disconnects the track battery TB from the rails of section 2T, releasing the track relay at the opposite end and causing coded current to be supplied to the track rails at that end, as explained in connection with Fig. 1B of the Talbert et al. patent. In this case signal 4LA or 4LB is cleared by the energization of a circuit (indicated by a dotted line) which includes the reverse contact b of relay 4LHS.

To set the system into operation for traffic movements from left to right to clear signal 2RA of the present application, the signal control relay 2RHS at station 1—2 is reversed by the operator and also the traffic relay 2WFS at station 3—4, and the latter causes coded current to be supplied to the rails of section 2T at the end adjacent thereto as described in the patent with reference to the corresponding relay WFSR. Under this condition signal 2RA or 2RB is cleared by the energization of the circuit which includes the reverse contact b of relay 2RHS.

Although in this case the transmission of two control codes is required, it will be noted that the starting button 1–2STB in addition to the usual contact a by which relay 1–2ST is manually energized to initiate the transmission of the control code to station 1–2 is provided with a second contact b, included in a circuit which may be traced from terminal B at back contact a of relay AR over wire 20, contact b of button 1–2STB, back contacts d of the indication relays 1TK and 2BK, contact e of the signal lever 2SG in its right-hand position, contact e of the switch lever 1SW in its normal position, and thence over contact c of lever 3SW in its reverse position or over back contact c of relay 3TK and contact c of lever 4SG in its normal or right-hand position, through the lower winding of relay 3–4ST to terminal C. It follows that when button 1–2STB is operated to energize the starting relay 1–2ST, the starting relay 3–4ST is also energized, provided the indication relays and control levers involved are in the proper position, so that a control code is also transmitted to station 3—4, following the transmission of a control code to station 1—2. The code transmitted to station 3—4 in this instance causes the reversal of the traffic relay 2WFS for the reason that terminal 4 is connected to terminal B over contact e of the selector relay 3–4S, contact b of lever 3SW or contact b of lever 4SG, back contact b of relay 3TK, contacts c of relays 2BK and 1TK, and contacts b of levers 1SW and 2SG.

When the left to right direction is set up in section 2T, relay 2FSA is maintained energized by the master code pulses received from the right-hand end of the stretch, to indicate the unoccupied condition of the block.

From the foregoing, it will be clear that the block indication relay 2BK is released only when the block governed by signals 2RA and 4LA is unoccupied, regardless of whether the system is active or inactive, and further that to activate the system for one direction only, the operation of a traffic relay at the exit end of the block is required in addition to the operation of the entering end signal control relay.

It is to be understood further that the foregoing description applies also to the similar system for the control of traffic movements through sections 5T, 6T and 7T in Fig. 1B of the present application.

The signalling apparatus for the single track blocks, such as the section 4T, is to be understood to be of the normally deenergized coded reversible track circuit type, such as is disclosed in Letters Patent of the United States No. 2,353,421, issued July 11, 1944, to Crawford E. Staples, for Railway Traffic Controlling Apparatus, or modifications thereof disclosed in pending applications for Letters Patent of the United States, Serial No. 19,366, filed on April 6, 1948, by Crawford E. Staples, and Serial No. 14,244, filed on March 11, 1948, by Charles W. Failor and Charles B. Shields.

In the system of Staples No. 2,353,421, and in the system of the present application each stretch of single track corresponding to those identified as sections 0T, 4T and 8T herein generally includes a plurality of cascade connected reversible coded track circuits and the stretch may also include one or more intermediate signal locations, not shown herein, the coded track circuit apparatus for all of the sections being normally deenergized.

The Staples system is arranged to be activated and the entering signal cleared for either direction of train movement by energizing the signal control relay for the entering signal for the desired direction, such as the relay 4RHS for signal 4RA, or relay 6LHS for signal 6LA, shown herein, which relays correspond respectively to the signal control relays 2EHSR and 3WHSR of the Staples patent.

When the system for the single track stretch is in the active condition, a decoding relay EDR or WDR at the entering end is supplied with a distinctive code, usually 180 impulses per minute, provided the entire block is unoccupied, and the release of this relay consequently is adapted to connect terminal B over its back contact *b* to channel 12 to indicate block occupancy in accordance with the requirements of my invention, provided the system is in its active condition at the time and the decoding relay which releases is the one at the entering end for the established direction. The decoding relays EDR and WDR are released when their location is established as the exit end of the block, and also when the system is in its normal inactive condition, and to prevent the control of channel 12 by these relays under such conditions, a directional stick relay, such as the relay 4RKS or 4LKS, is provided herein having a normally open front contact *b* in the circuit by which the associated decoding relay controls channel 12, the mode of operation of these relays being as follows:

Assuming that the signal control relay 4RHS is operated to reverse to activate the system for block 4T and to clear the signal 4RA, a pulse of steady current of several seconds duration is supplied to the track rails of the stretch 4T and repeated section by section to energize a traffic stick relay 4WBS at the exit end, shown herein in Fig. 1B, and corresponding to relay 3WBSR shown in Fig. 1*c* of Patent No. 2,353,421. Relay 4WBS by opening its back contact *a* insures that relay 4LKS remains released, and as explained in the patent, the energization of the corresponding relay 3WBSR of the patent supplies coded current to the track rails which is repeated section by section to energize relay 4EDR, provided the block is unoccupied, completing a circuit in Fig. 1A as shown herein, from one terminal B of the local source of current at back contact *a* of relay 4EBS over front contacts *c* of the detector track relay 3TR and of the decoding relay 4EDR and a reverse contact *c* of the signal control relay 4RHS through the winding of relay 4RKS to the other terminal C of the local source, so that relay 4RKS picks up. Since the energization of relay 4EDR precedes that of relay 4RKS, in the case just described, its contact *b* opens before contact *b* of relay 4RKS closes, and channel 12 does not become energized at this time. Signal 4RA or 4RB is cleared when relay 4EDR becomes energized, in this instance, for the reason that the reverse contact *b* of relay 4RHS in the signal circuit is now closed.

When a train governed by signal 4RA enters section 3T, relay 3TR releases and relay 4RHS is restored to normal as explained in the hereinbefore referred to Jackel patent, but relay 4RKS is maintained energized over a stick circuit including its own front contact *a* and a back contact *c* of relay 3TR or 4EDR, the latter releasing when the train enters section 4T, connecting terminal B to wire 12 at station 3—4, and causing the transmission of an indication code to energize the block indication relay 4RBK. When the block is vacated, relay 4EDR is reenergized, releasing relay 4RKS to cancel the block indication, provided the signal control relay has been left in its normal position, and at the same time the exit end traffic relay is released as explained in Patent No. 2,353,421 to restore the apparatus for the single track stretch to its normal deenergized direction.

For the opposite direction the entrance end relays 4LKS, 6LHS and 4WDR and the exit end traffic relay 4EBS function in a similar manner as will be readily apparent, but in this case the occupancy of section 4T is indicated by relay 4LBK of Fig. 1B instead of by relay 4RBK of Fig. 1A.

In applying my invention to the centralized traffic control system of the above-mentioned Jackel patent, I provide each of the starting relays ST at the office with a second winding which is included in circuits by which the starting relay is picked up in multiple with a block indication relay upon the reception of an indication that the train has entered an extended approach zone for the signal controlled by the starting relay in question.

The master lever by which the apparatus of my invention is governed is the one identified by the reference character A in Fig. 1A. Lever A when closed energizes a repeating relay AR, having a contact *a* which disconnects terminal B from wire 20 leading to the contacts of all of the starting buttons STB to disable the manual control of the starting relays, and a contact *b* which connects terminal C to wire 22 to prepare circuits for the upper windings of these relays to enable the automatic approach starting circuits to function. Additionally, a pen magnet PM in the train graph provided in the control machine for recording train movements is energized over front contact *a* of relay AR, so that a record is made on the daily train sheet which indicates whether or not the automatic starting circuits are in use.

The mode of operation of the apparatus of my invention will now be described in connection with the movement of a train through the stretch of track shown in the track plan, in the direction from left to right.

It will be assumed that signal 2RA is located at the beginning of the controlled territory, and since the purpose of my apparatus is to control only the signals which are a considerable distance in advance of the train, it is not adapted to control signal 2RA nor the next signal 4RA in this instance. The operator therefore clears signals 2RA and 4RA by manual control in the usual manner, moving the signal levers 2SG and 4SG to the right and pressing the starting button 1–2STB with switch A open to energize the starting relays 1–2ST and 3–4ST, and thereby initiate the transmission of control codes to stations 1—2 and 3—4, as explained in the Jackel patent, and he will then close switch A to disable the manual starting circuits and to activate the automatic starting circuits, and he will also reverse the signal levers 6SG, 8SG, etc. for each of the signals in advance for whatever distance he may choose, no further action on his part being needed.

The control code initiated by relay 1–2ST reverses relay 2RHS, and the one initiated by relay 3–4ST reverses relay 2WFS to set the normally inactive signaling system for section 2T into operation to clear signal 2RA in the manner described in the Talbert et al. patent, and also reverses relay 4RHS to set the normally deenergized signaling system for section 4T into operation to clear signal 4RA in the manner described in the Staples patent, and indication codes will be initiated by the clearing of the signals to pick up the signal indication relays 2RHK and 4RHK.

When the train passes signal 2RA, the release of the track relay 1TR connects terminal B at its back contact *b* to terminal 10, and connects terminal B over contacts *a* of relays 1NWP and 1TR to terminal 14, at the station 1—2, and initiates an indication code by which the office delivery relay 1–2D is momentarily energized, and concurrently, terminal B is connected to the corresponding terminals 10 and 14 at the office to pick up the track indication relay 1TK and the block indication relay 2BK.

During the pick up period of relay 2BK, circuits are closed momentarily to pick up the starting relays 5–6ST and 7–8ST. The circuit for relay 5–6ST comprises a branch of the circuit for relay 2BK which extends from terminal B at the office terminal 14 referred to over front contact *f* of the delivery relay 1–2D, back contact *b* of relay 2BK, contact *k* of relay 1–2D, wire 21, back contact *f* of relay 6RHK, contacts *d* of levers 6SG and 5SW through the upper winding of relay 5–6ST to wire 22, and thence to terminal C at contact *b* of relay AR. Terminal B at this office terminal 14 is also connected momentarily to contact *j* of relay 1–2D, so that a circuit is completed from this contact over wire 23 and back contact *d* of relay 6RHK, contacts *c* of levers 6SG and 5SW, through relay 7–8ST, and thence over wire 22 to terminal C, so that relay 7–8ST is also energized.

The energization of relays 5–6ST and 7–8ST results in the transmission of control codes whereby the wayside signaling systems for sections 6T and 8T are activated and signals 6RA and 8RA are cleared, the operations being similar to those already described by which signals 2RA and 4RA are cleared.

It may be that the operator will reverse signal lever 2SG only, prior to pressing button 1–2STB, in which case the code transmitted to station 3—4 will be effective to reverse the traffic relay 2WFS to enable signal 2RA to be cleared, but signal 4RA will remain at stop. Signal 4RA may then be cleared by reversing lever 4SG and pressing button 3–4STB to transmit a second code to station 3—4, prior to closing switch A.

Similarly, if lever 8SG is left normal until after the control codes due to the occupancy of section 2T are transmitted to stations 5–6T and 7—8, signal 6RA will be cleared but signal 8RA will remain at stop. In this case, if lever 8SG is reversed after these codes are transmitted, assuming that relays 4RKS and 4EDR have been energized as already described, it will be seen that when the train enters section 4T, the release of the decoding relay 4EDR connects terminal B at its back contact *b* over front contact *b* of relay 4RKS to terminal 12 at station 3—4, and causes an indication code to be transmitted from station 3—4 in which the corresponding terminal 12 at the office is connected to terminal B to energize the block indication relay 4RBK, and a connection from terminal B at this terminal 12 is completed momentarily over back contact *b* of relay 4RBK, contact *h* of relay 3–4D, wire 24, contacts *d* of relay 8RHK and of levers 8SG and 7SW through relay 7–8ST to wire 22 and thence to terminal C, so that relay 7–8ST is energized to transmit a second code to station 7—8, whereby the wayside circuits for section 8T are activated and signal 8RA is cleared in response to the occupancy of section 4T instead of section 2T as in the first example. However, if signal 8RA has already been cleared due to the accupancy of section 2T, the indication relay 8RHK will be energized and the opening of its back contact *d* in the circuit including wire 24 prevents the transmission of a second code to station 7—8, as a result of the occupancy of section 4T.

Relay 8RHK is also energized when signal 8RA is at stop, and the time locking apparatus associated therewith is effective, as manifested by the energization of relay 8ASP. Relay 8LHK in this case is energized by relay 8ASP along with relay 8RHK, and the circuit which includes wire 24 is completed over front contact *e* of relay 8LHK. Each of the approach controlled starting circuits is arranged in this manner, as will be apparent from the drawings.

When the train above referred to enters section 6T, an indication code is transmitted from station 5—6 by which wires 25 and 26 are momentarily energized over contacts *k* and *j* of relay 5–6D.

Fig. 1A has been arranged to illustrate the apparatus similar to that shown thereon but located at the next two stations at the right of those shown on Fig. 1B, by extending the wires 25, 26 and 27 to the left-hand margin of Fig. 1A, and it will be clear without further description that the entering signal RA for the next passing track at the right of section 8T will be cleared automatically as a result of the momentary energization of wires 25 and 26, and the entering signal RA for the next single track stretch at the right of section 8T will be cleared automatically as the result of the energization of wire 26 or 27.

Considering now the right to left direction of traffic movement and assuming that signal 8LA is the first signal in the controlled territory: the operator will clear signals 8LA and 6LA manually by moving signal levers 8SG and 6SG to the left, and pressing the corresponding starting buttons 7–8STB and 5–6STB, and will then close switch A to energize relay AR and will move the signal levers 4SG, 2SG, etc. to the left.

When the train governed by signal 8LA enters section 7T, the track relay 7TR opens its front contact *a* and releases relay 6WCTM, which deenergizes the track circuit system for section 6T, and relay 6FSA releases to connect terminal B at its back contact *a* to terminal 14 at station 5—6, to cause terminal B to be connected to the corresponding terminal 14 at the office, and relay 5–6D picks up to initiate the transmission of an indication code from station 5—6 by which the office delivery relay 5–6D is momentarily energized, and concurrently, terminal B is connected to the corresponding terminal 14 at the office to energize relay 6BK and to connect terminal B at this terminal 14 momentarily over contact *f* of relay 5–6D, contact *b* of relay 6BK and contact *h* of relay 5–6D to wire 28 to energize relay 3–4ST, thereby causing a control code to be transmitted to station 3—4 to activate the circuits for section 2T in the proper direction so that signal 4LA will clear.

Similarly, since relays 4LKS and 4WDR are energized, over circuits similar to those already described for relays 4RKS and 4EDR, and since relay 4WDR releases when the train moves from section 5T to section 4T, the release of relay 4WDR connects terminal B over its back contacts *b* and front contact *b* of relay 4LKS to terminal 12 at station 5—6, and causes the transmission of an indication code which energizes relay 5–6D and connects terminal B to the corresponding office terminal 12. This results in the energization of the block indication relay 4LBK and connects terminal B momentarily to wire 29 over contact *d* of relay 5–6D, contact *b* of relay 4LBK and contact *m* of relay 5–6D to cause a control code to be transmitted to station 1—2 to effect the clearing of signal 2LA.

When the train enters section 3T, relay 2FSA is released so that terminal B at its back contact *a* is connected to terminal 14 at station 1—2, and an indication code is transmitted to energize relay 1–2D and to connect terminal B to the corresponding office terminal 14 to energize relay 2BK and to connect this terminal B momentarily over contact *f* of relay 1–2D, contact *b* of relay 2BK, and contact *h* of relay 1–2D to wire 30. Fig. 1B has been arranged so that it may be used to show the approach controlled starting circuits for signals LA to the left of Fig. 1A by extending wires 30 and 31 to the right-hand margin of Fig. 1B. By placing Fig. 1B at the left of Fig. 1A, it will be seen that the effect of energizing wire 30 is to clear the entering signal LA for the next passing track at the left of section 0T.

Finally, when the train enters section 0T, terminal B is connected to terminal 12 at station 1—2, over contacts *b* of relays OWDR and OLKS, and an indication code is transmitted by which relay 1–2D is energized and terminal B is connected to the corresponding office terminal 12 and consequently is connected momentarily to wire 31 over contact *m* of relay 1–2D to effect the clearing of the entering signal LA beyond the passing track at the left of section 0T.

It will be seen that in each instance the codes for effecting the automatic approach clearing of the signals are transmitted only when the signals which they govern are at stop and the signal levers for such signals have been reversed to indicate that it is desired to have such signals assume their clear condition at the proper times as predetermined by the rate of progress of the train.

It will be readily apparent that my invention is particularly advantageous for use in large installations. In such cases the total number of stations exceeds the capacity of a single set of coding apparatus, and the controlled territory is divided into sections with a separate office coding unit and a set of station coding units for each section. In this case the portion of the operator's control board governed by each set of coding apparatus is provided with a separate master switch A, and the automatic approach clearing may be in effect in one or more sections while the operator is engaged in arranging a meeting point for two opposing trains by manual control in another section.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In a centralized traffic control system for a stretch of railway track divided into traffic blocks each having a railway signal at its entrance end for governing train movements into that block, said system having a signal control relay for each signal, each such relay being effective when normal to hold the associated signal at stop and effective when reversed to enable the associated signal to be cleared, said system also having manually operable signal levers in a control office, and a communication system connecting said office with a plurality of stations, including a station at each signal location, said communication system being adapted to be set into operation at times to transmit control codes from the office to said stations for positioning the signal control relays at the different stations, each in accordance with the position of a corresponding signal lever at said office, said communication system being also adapted to automatically transmit indication codes at other times from said stations to said office to position selected indication relays at the office in accordance with the condition of the signal at the transmitting station and for also indicating the condition of occupancy of the traffic block governed by such signal; the combination with the foregoing of a system of control code initiating circuits at said office for at times initiating the automatic operation of said communication system, including means at said office responsive to the reception of an indication code from a first station showing that a train has entered a particular block for momentarily closing a selected one of said initiating circuits, thereby automatically setting said communication system into operation to cause the transmission of a control code to a second station located at least two blocks in advance of said first station, in the direction of movement of said train, for reversing the signal control relay at said second station, and means for so controlling said selected initiating circuit to enable the transmission of such code to be initiated only if the signal governed by such signal control relay is indicated to be at stop by its indication relay and the corresponding signal lever has been operated to its reverse position to designate that such signal is to be cleared.

2. In a centralized traffic control system for a stretch of single track railway divided into traffic blocks each having a railway signal at each end for governing traffic movements into that block, a signal control relay for each signal having a normal and a reverse position, a circuit closed by each signal control relay only in its reverse position for controlling the associated signal, a signal lever at a control office for each signal control relay, a communication system connecting said office with stations at the signal locations, said communication system being adapted to be set into operation at times to transmit control codes from the office for selectively operating the signal control relays at the different stations between their normal and reverse positions, each in accordance with the position of the corresponding signal lever, means at each station for setting said communication system into operation at other times to transmit indication codes to said office reflecting the movement of a train past such station, starting means at the office responsive to the reception of an indication that a train has passed one such station moving in a particular direction for automatically initiating the transmission of a control code to another selected station in advance of said train for reversing the signal control relay at such advance station, and means preventing the response of said starting means to the indication code received from said one station unless the signal lever governing the signal control relay at said other station occupies its reverse position when such indication code is received.

3. In a centralized traffic control system for a stretch of railway track divided into a plurality of successive traffic blocks, a signal for each block for governing the movement of traffic in a given direction into such block, a signal control relay for each signal, a normally inactive communication system for transmitting control codes at times for governing the operation of said signal control relays each in accordance with the position of an associated signal lever at a control office and for transmitting indication codes at other times for indicating at said office the condition of occupancy of each of said blocks, a plurality of starting relays at said office including one for each signal lever, each such relay being effective when operated to cause the transmission of a control code by said communication system for selecting and operating one of said signal control relays in accordance with the position of its signal lever, a manually controllable energizing circuit for each starting relay, circuit controlling means rendered effective following the operation of the signal levers for certain of said signals to their signal clearing positions to prepare circuits for automatically operating the starting relays associated with such levers and to prepare said communication system to select and operate the corresponding signal control relays to effect the clearing of the associated signals, and means for completing each such prepared circuit in response to the reception of an indication code transmitted by said communication system showing that a train is approaching a particular block signal in said stretch located in the rear of the signal which is to be cleared by such automatic operation.

4. In a centralized traffic control system for the control of railway signals having a communication system arranged as described in claim 3 for effecting the automatic approach clearing of certain of the signals, a manually operable two position master lever at the control office, and contacts controlled by said master lever for disabling the circuits for said starting relays by which the operation of said communication system is manually initiated, when said lever is in one position and for disabling the circuits for said starting relays by which the operation of said system is automatically initiated by the received indications of block conditions, when said lever is in its other position.

FRANKLIN H. FAILOR.

REFERENCES CITED

The following references are of record in the file of this patent:

UNITED STATES PATENTS

| Number | Name | Date |
|---|---|---|
| 2,360,948 | Jerome | Oct. 24, 1944 |
| 2,361,445 | Allen | Oct. 31, 1944 |
| 2,387,152 | Jerome et al. | Oct. 16, 1945 |
| 2,420,579 | Young | May 13, 1947 |
| 2,430,291 | Hays | Nov. 4, 1947 |